June 17, 1969   D. E. LORENZI ET AL   3,450,985
EDDY CURRENT TESTING SYSTEM INCLUDING BRIDGED-T NETWORK
Filed Nov. 12, 1963
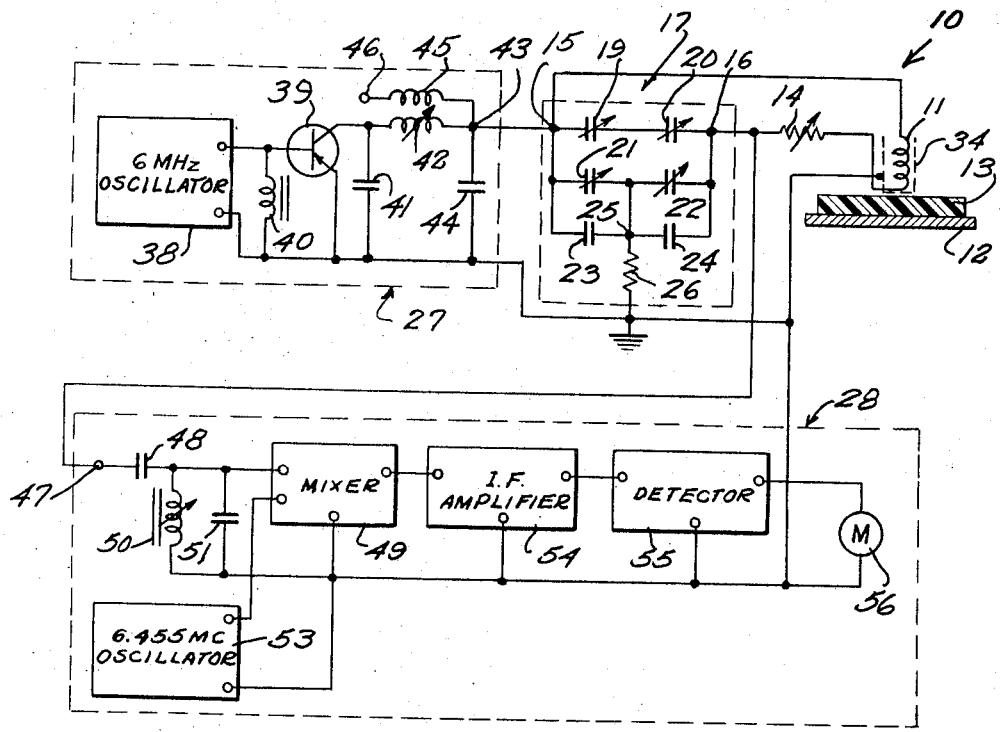
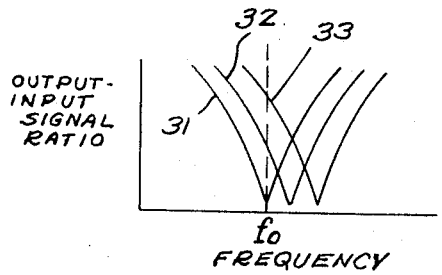
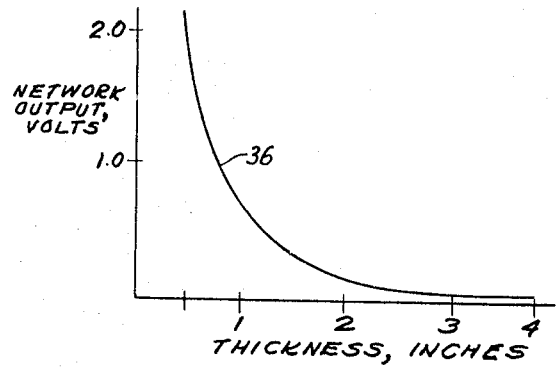
INVENTORS
Donald E. Lorenzi
Kenneth K. Groble
Michael W. Retsky
ATTORNEYS United States Patent Office 3,450,985
Patented June 17, 1969

3,450,985
EDDY CURRENT TESTING SYSTEM INCLUDING BRIDGED-T NETWORK
Donald E. Lorenzi, Des Plaines, and Kenneth K. Groble and Michael W. Retsky, Chicago, Ill., assignors to Magnaflux Corporation, Chicago, Ill., a corporation of Illinois
Filed Nov. 12, 1963, Ser. No. 322,634
Int. Cl. G01r 33/14
U.S. Cl. 324—40
5 Claims

ABSTRACT OF THE DISCLOSURE

Eddy current testing system in which a test coil is placed in inductive relation to a part under test with its effective inductance being changed within a certain range with changes to be measured. A bridged T network including series capacitance means and shunt resistance means is connected between an oscillator and measuring means with the test coil being connected in parallel relation to the capacitor means which is preferably adjustable. The oscillator frequency and circuit values are such that a null is produced outside the range of change of values of the effective inductance of the coil and the frequency is preferably higher than 0.5 mHz., most preferably being on the order of 5 mHz. Additional features include the use of a Faraday shield about the coil, the provision of a parallel resonant circuit across the input of the measuring means, and the provision of a resistor in series with the coil, having a resistance at least five times that of the coil.

---

This invention relates to an eddy current testing system and more particularly to a system specifically designed for measuring the thickness of a dielectric material with a high degree of accuracy and reliability, with comparatively simple circuitry. It will be understood that various features of the invention have other applications.

Eddy current testing systems are known wherein the effect on a test coil is measured to determine the characteristics of a structure under test, and particularly to determine the thickness of a dielectric between the test coil and a base member of conductive material. Such systems have been generally satisfactory for many applications but they have not been highly accurate in measuring relatively large thicknesses on the order of half an inch or larger and they have been adversely affected by variables including temperature variations and variations in conductivity and permeability of the base member.

According to an important feature of this invention, a test coil is coupled in parallel relation to a series capacitive impedance of a network having a shunt resistive impedance, the network being coupled between an oscillator and a measuring circuit. With this comparatively simple arrangement, it is possible to obtain a high degree of sensitivity and an accurate measurment of relatively small changes in the effective inductive reactance of the test coil, such as produced by changes in the thickness of a dielectric between the coil and a base member of conductive material.

Another important feature of the invention resides in the discovery that the effect of changes in conductivity or permeability of the base member can be minimized and practically eliminated by operating at a sufficiently high frequency. A frequency on the order of at least 0.5 mHz. is used, and preferably on the order of 5 mHz., a frequency of 6 mHz. being found to be very satisfactory.

A further important feature of the invention is in the provision of a resistor in series with the test coil having a value on the order of at least 5 to 10 times the effective resistance of the coil. It is found that this provides a very stable operation and minimizes the effect of variations in operating conditions, particularly temperature variations.

Still another important feature of the invention is in the provision of a narrow band amplifier in the measuring circuit, the center of the pass band of the amplifier being at the oscillator frequency. This minimizes the effect of transient interference signals and other variables.

A specific feature is in the use of a heterodyne amplifier including a mixer, an oscillator and an IF amplifier with which it is possible to obtain very stable operation particularly at high frequencies, with high sensitivity and the desired narrow band pass characteristic.

Further important features of the invention reside in the use of a Faraday shield in conjunction with the test coil and in the specific circuit of the bridge and other specific arrangements for obtaining optimum performance.

These and other features of the invention will become more fully apparent from the following detailed description taken in conjunction with the accompanying drawing which illustrates a preferred embodiment and in which:

FIGURE 1 is a schematic diagram of an eddy current thickness measuring system constructed according to the principles of this invention;

FIGURE 2 is a graph illustrating frequency response characteristics, for explaining the principles of the invention; and FIGURE 3 is a graph illustrating measured output versus thickness, with a system constructed according to FIGURE 1.

Reference numeral 10 generally designates a thickness measuring system constructed according to the principles of this invention. The system 10 comprises a test coil 11 which is separated from a base member 12 of conductive material by a dielectric member 13, the system being used to measure the thickness of the dielectric member 13.

The test coil 11 is connected in series with an adjustable resistor 14 between a pair of circuit points 15 and 16 forming terminals of a balancing network 17. The network 17 comprises a pair of adjustable capacitors 19 and 20 connected in series between circuit points 15 and 16, a pair of variable capacitors 21 and 22 and a pair of fixed capacitors 23 and 24 respectively connected between circuit points 15 and 16 and a circuit point 25, and a resistor 26 connected between circuit point 25 and ground. The network 17 is thus a T network having series capacitive impedance means and shunt resistive impedance means, the series capacitive impedance means being bridged by the circuit including coil 11, so that the network may be referred to as a bridged T network. It is noted that the series impedance of the network need not be purely capacitive and the shunt impedance need not be purely resistive, but they should preferably be primarily capacitive and resistive.

The circuit point 15 is connected to the output of oscillator means generally designated by reference numeral 27 and preferably operated at a frequency of 6 mHz. The circuit point 16 is connected to the input of a measuring circuit generally designated by reference numeral 28, operative to measure the AC voltage between circuit point 16 and ground.

With this arrangement, a null output will be obtained from the network 17 at a certain frequency dependent upon the thickness of the dielectric 13 and the circuit values. FIGURE 2 shows frequency response curves 31, 32 and 33 of types obtained with the circuit, curve 31 representing the output to input signal ratio obtained with a large thickness value, curve 32 representing the ratio obtained with an intermediate thickness value and curve 33 representing the ratio obtained with a small thickness value. It will be noted that with operation of the circuit at a frequency $f_0$ coinciding with the null of the curve 31, the ratio is at a minimum value with the large thickness value and increases as the value is reduced. The frequency of operation could, however, be chosen to coincide with the null of the curve 33 in which case the ratio would be at a minimum with the small thickness value and would increase with an increase in the thickness value. However, if chosen to coincide with the null of an intermediate thickness value, it would not be possible to tell whether a ratio greater than the null value represented a greater or lesser thickness. Accordingly, the frequency of operation should coincide with the null corresponding to a thickness value outside the range of values to be measured.

It is important to note that it is desirable to have some degree of final adjustment of the operation of the system in order to obtain optimum results. If desired, the frequency of operation could be adjusted, but in the illustrated system, the frequency of operation is fixed and instead the circuit values are adjustable, and particularly the capacitors 19–22 are adjustable in order to obtain the null at the proper point. The adjustment of the capacitors achieves the same general effect as would be achieved by the adjustment of frequency, and has the advantage of simplicity, since if the frequency were adjusted, both the oscillator means 27 and the measuring circuit 28 would have to be adjusted. In addition, the relative adjustment of capacitors 21 and 22 is desirable in order to obtain a proper balance of the network 17.

In addition to adjustment of the capacitors 19–22, the resistor 14 is adjustable to obtain proper balance of the circuit, and minimum output at the null point. It is found that in any case, the resistor 14 should have a value substantially higher than the effective resistance of the coil 11, preferably on the order of at least 5 to 10 times that of the effective resistance of the coil 11. Under such conditions, a high degree of stability is obtained, and the effect of variables is minimized, particularly with respect to temperature variations which may affect the effective resistance of the coil 11.

A specific feature is in the provision of a Faraday shield 34 having portions surrounding the coil 11 and also having a portion on the end of the coil 11 which is engaged with the dielectric 13, as diagrammatically illustrated. The shield 34 is connected to ground and minimizes stray capacitance effects on the coil 11.

By way of illustrative example and not by way of limitation, the coil 11 may comprise ten turns of number 30 copper wire on a one inch diameter form, the turns being equally spaced to provide a length on the order of one-fourth inch. The Faraday shield may have a diameter of one and one-fourth inches with an end portion spaced from the end of the coil by a distance on the order of one-sixteenth of an inch or more. A type M ferrite core having a one-fourth inch diameter and a one-half inch length may be disposed within the coil. With regard to other circuit values, the resistor 14 may comprise a 3 ohm 1 watt fixed resistor in parallel with a 25 ohm adjustable resistor, capacitor 19 may have a capacitance of from 1.5 to 15 pf., capacitor 20 may have a capacitance of from 3.35 to 22.5 pf., capacitors 21 and 22 may each have a capacitance of from 8 to 50 pf., capacitors 23 and 24 may each have a capacitance of 200 pf., and resistor 26 may have a resistance of 680 ohms.

With such values, a response curve 36 may be obtained as illustrated in FIGURE 3, representing the output of the bridge in millivolts (after amplification in the measuring means 28), versus the thickness in inches. It will be noted that the response is quite high at one-half inch thickness and decreases rapidly as the thickness increases, but with sufficient slope to permit relatively accurate measurement out to about three inches of thickness. In this example, the bridge was adjusted to provide a null at about three and one-half inches. An indicator in the measuring circuit 28 may, of course, be calibrated to read directly in thickness if desired.

The oscillator means 27 comprises a 6 megacycle oscillator of conventional design, preferably a crystal-controlled transistor oscillator. The output of the oscillator 38 is applied to the base of a transistor 39 forming a buffer stage, the base being additionally connected through an inductor 40 to ground. The emitter of the transistor 39 is grounded while the collector thereof is connected through a capacitor 41 to ground and through an adjustable inductor 42 to a circuit point 43 connected through a capacitor 44 to ground and through an inductor 45 to a power supply terminal 46. Inductor 42 together with capacitors 41 and 44 form a low pass filter to eliminate any harmonics that may be present. Circuit point 43 together with the ground connection form output terminals for the oscillator circuit 27, circuit point 43 being directly connected to the circuit point 15 of the network 17.

The measuring circuit 28 comprises an input terminal 47 connected through a capacitor 48 to one input terminal of a mixer 49 and also through the parallel combination of an adjustable inductor 50 and a capacitor 51 to ground. Inductor 50 and capacitor 51 form a parallel resonant circuit which is preferably tuned to the oscillator frequency of 6 megacycles. The mixer 49 has a second input connected to the output of an oscillator 53, preferably a crystal-controlled transistor oscillator operated at a frequency of 6.455 mHz.

The mixer 49 develops an output signal at a frequency of 455 kHz. which is applied to the input of an IF amplifier 54 tuned to 455 kHz, the output of the IF amplifier 54 being applied to a detector 55 having an output connected to a meter 56 which indicates the output voltage of the network 17. The mixer 49, oscillator 53, IF amplifier 54 and detector 55 may be of conventional construction, such as customarily employed in radio circuits. With the heterodyne operation, a highly stable operation is obtained, with high sensitivity and with a narrow band pass characteristic.

As used herein and in the claims, the expression "on the order" will be understood to mean from 0.2 to 2 times the stated value.

It will be understood that modifications and variations may be effected without departing from the spirit and scope of the novel concepts of this invention.

We claim as our invention:

1. In an eddy current testing system including a test coil arranged to be placed in proximity to a structure to be tested with the inductance of said coil being affected by variables including the conductivity and permeability of portions of said structure and the physical relation of said test coil to said portions, said system being arranged for producing a quantitative indication of changes in one of said variables, occurring between certain limits, oscillator means having a pair of output terminals and arranged to produce a high frequency signal between said output terminals, measuring means having a pair of input terminals and including indicating means for indicating the magnitude of the voltage between said input terminals, means connecting one of said output terminals and one of said input terminals, a network including a pair of capacitive impedance means connected in series between the other of said output terminals and the other of said input terminals and resistive impedance means connected between an intermediate point of said capacitive impedance means and said one of said input terminals, and means coupling said test coil between said other of said output terminals and said other of said input terminals including a resistor in series with said test coil, said resistor having a value on the order of at least about five times the effective resistance of said coil to form a parallel resonant circuit with the resonant frequency of said resonant circuit and the frequency of said high frequency signal being approximately the same and being such as to produce a minimum voltage at said input terminals of said measuring means when said one of said variables is at one of said limits, said indicating means being operative to indicate the magnitude of the voltage applied to said input terminals varying from said minimum value to the voltage produced at said input terminals when said one of said variables is at the other of said limits thereof.

2. In an eddy current testing system as defined in claim 1, said measuring means comprising a mixer coupled to said input terminals, an oscillator arranged to supply a second high frequency signal to said mixer at a frequency substantially different from the frequency of said oscillator means, an amplifier coupled to the output of said mixer and tuned to a frequency equal to the difference between the frequencies of said high frequency signals, said indicating means being coupled to the output of said amplifier.

3. In an eddy current testing system as defined in claim 1, said test coil being arranged to be placed against one surface of a layer of dielectric material the opposite surface of which is disposed against a base member of highly conductive material, said measured variable being the thickness of said layer of dielectric material, the frequency on said high frequency signal and the resonant frequency of said resonant circuit being on the order of about 5 megahertz with the signal produced at said input terminals of said measuring means being substantially independent of variations in the conductivity and permeability of said base member.

4. In an eddy current testing system as defined in claim 3, said measuring means comprising a mixer coupled to said input terminals, an oscillator arranged to supply a second high frequency signal to said mixer at a frequency substantially different from the frequency of said oscillator means, an amplifier coupled to the output of said mixer and tuned to a frequency equal to the difference between the frequencies of said high frequency signals, said indicating means being coupled to the output of said amplifier.

5. In an eddy current testing system as defined in claim 1, said pair of capacitive impedance means and said resistor in series with said test coil being adjustable for balancing of said network.

References Cited

UNITED STATES PATENTS

| | | | |
|---|---|---|---|
| 2,751,552 | 6/1956 | Brenner et al. | 324—34 |
| 2,902,765 | 9/1959 | Chater | 324—34 |
| 2,909,725 | 10/1959 | Bell | 324—34 |
| 3,094,658 | 6/1963 | Bravenec et al. | 324—34 |
| 2,933,677 | 4/1960 | Lieber | 324—34 |

OTHER REFERENCES

Tuttle, W. N.: Bridge-T and Parallel-T Null Circuits for Measurements at Radio Frequencies, Proceedings of the I.R.E. January 1940, vol. 28, pp. 23–28.

Choudhury, J. K. et al.: Magnetic Measurements With The Bridged-T Network, Journal of Scientific Instruments, vol. 35, April 1958, pp. 145–146.

RUDOLPH V. ROLINEC, *Primary Examiner.*

R. J. CORCORAN, *Assistant Examiner.*

U.S. Cl. X.R.

333—75